United States Patent [19]

Naab et al.

[11] 4,267,854
[45] May 19, 1981

[54] FLOOD VALVE

[75] Inventors: Carlton W. Naab, Williamsville; Roman Jankowiak, Cheektowaga, both of N.Y.

[73] Assignee: Conax Corporation, Buffalo, N.Y.

[21] Appl. No.: 64,110

[22] Filed: Aug. 6, 1979

[51] Int. Cl.³ ............................................. F16K 17/40
[52] U.S. Cl. ...................................... 137/72; 137/76
[58] Field of Search .................. 89/1 B; 137/67, 72, 137/74, 75, 76, 77

[56] References Cited
U.S. PATENT DOCUMENTS

| | | | |
|---|---|---|---|
| 824,935 | 7/1906 | Jenczewsky | 137/76 |
| 2,620,815 | 12/1952 | Margraf et al. | 137/72 X |
| 2,998,018 | 8/1961 | Beck et al. | 137/74 |
| 3,008,479 | 11/1961 | Mancusi | 137/72 X |
| 4,046,157 | 9/1977 | Cazalaa et al. | 137/74 |
| 4,164,953 | 8/1979 | Naab et al. | 137/72 |

Primary Examiner—Martin P. Schwadron
Assistant Examiner—Richard Gerard
Attorney, Agent, or Firm—Christel, Bean & Linihan

[57] ABSTRACT

A flood valve adapted to close an opening through a barrier wall separating a fluid from a space, the valve having a plastic body with a bore therethrough, a piston slidable in the bore, a heating element carried by the body and having a section extending across the bore to restrain the piston against movement out of the bore, and a spring urging the piston against the restraining section of the heating element, the piston normally sealing the bore and the heating element, when energized, burning through the plastic body material to release the piston for admission of fluid through the bore to the space.

13 Claims, 3 Drawing Figures

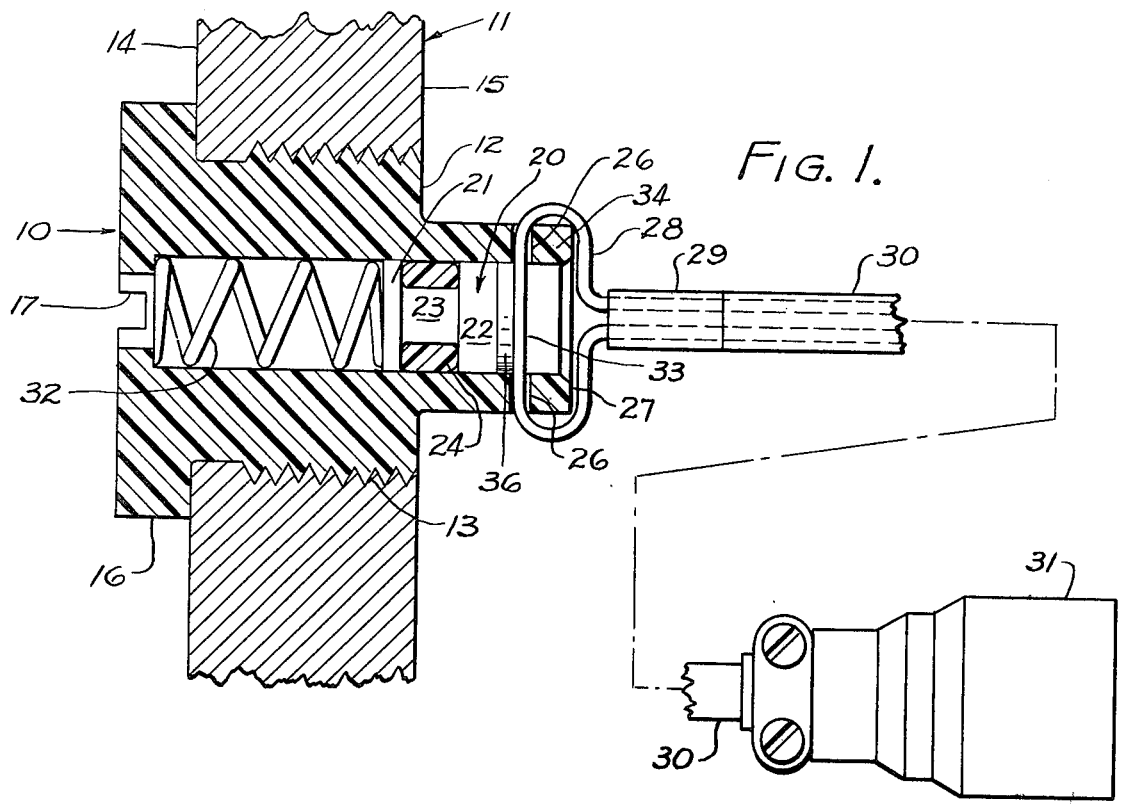
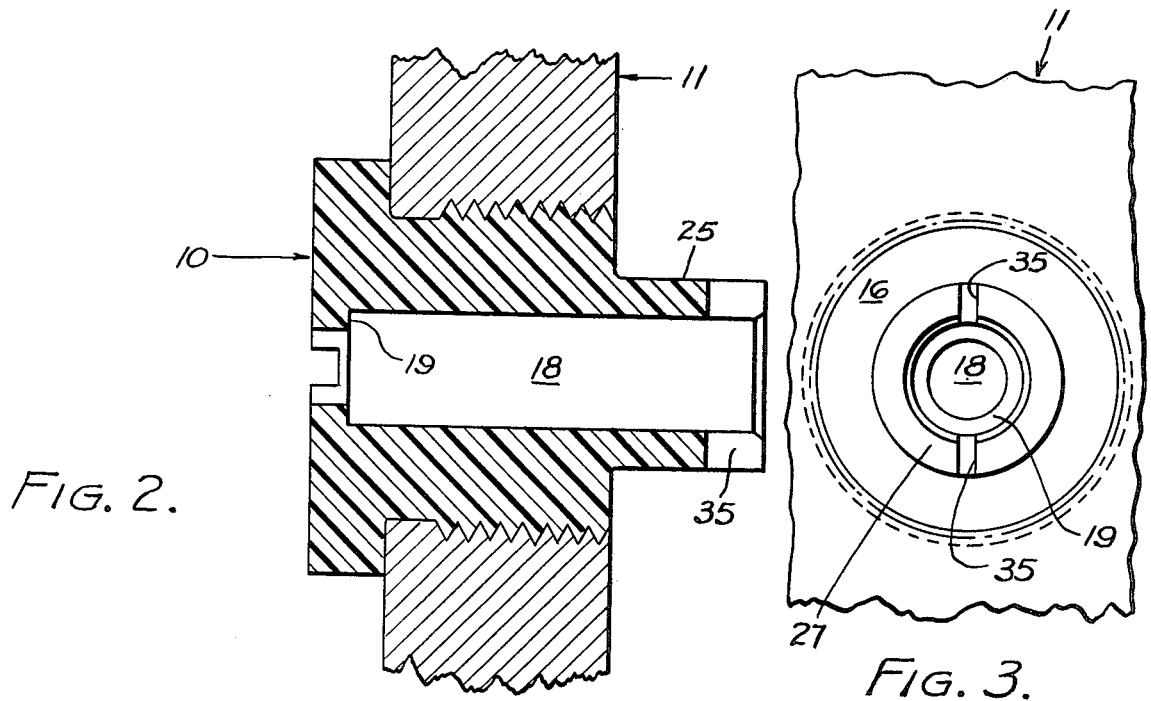

4,267,854

FLOOD VALVE

SUMMARY OF THE INVENTION

This invention relates generally to the valve art, and more particularly to an improved flood valve of the electro-thermal type which can be selectively operated to permit the passage of fluid therethrough.

A primary object of this invention is to provide a flood valve which is very simple in construction, relatively inexpensive, extremely reliable and totally quiet in operation.

The flood valve of this invention uses an electric heating element to melt a portion f a tubular plastic body member to release a sealing piston. It is characterized by the heating element also being a restraining member normally holding the sealing piston in the bore of the valve body. Upon energizing the heating element, it melts its way through the plastic material of the body member, releasing itself and thereby freeing the piston to move out of the bore and open the same for the passage of fluid. The foregoing and additional objects, advantages and characterizing features of this invention will become apparent from the ensuing detailed specification of an illustrative embodiment thereof, reference being made to the accompanying drawing wherein like reference numerals denote like parts throughout the various views.

BRIEF DESCRIPTION OF THE DRAWING

FIG. 1 is a view, partly in elevation and partly in longitudinal section showing a flood valve of this invention closing an opening through a wall separating fluid under pressure from a relatively unpressurized space, the electrical connection for the heater element being broken away to indicate indeterminate length;

FIG. 2 is a view like FIG. 1, but showing the valve after it has been actuated to release the sealing piston assembly and permit communication between opposite sides of the barrier wall in which the valve is mounted;

FIG. 3 is a fragmentary end elevational view of the open valve of FIG. 2.

DESCRIPTION OF THE ILLUSTRATED EMBODIMENT

Referring to the accompanying drawing, there is shown a flood valve of this invention generally designated 10, the valve being positioned in an opening through a barrier wall 11 separating a fluid on one side of the wall from a relatively unpressurized space on the other side thereof. Flood valve 10 is of general utility, and can be employed in a variety of arrangements where it is desired to separate fluid, either a gas or liquid, from a relatively unpressurized space until such time as communication therebetween is to be effected. For example, the valve can be used to selectively admit fluid to a chamber, or to selectively permit the escape of fluid from a chamber. Normally, valve 10 closes the opening through wall 11, as shown in FIG. 1, while being selectively activated to open the communicating passageway and permit fluid to pass through the wall from one side to the other side thereof, this being the condition illustrated in FIG. 2.

Looking now at FIG. 1, valve 10 includes a body member 12 of one piece construction having threaded engagement in an opening 13 through wall 11, the wall separating fluid, under pressure, for example water, on its side 14 from a relatively unpressurized space on the side 15 of wall 11. Body member 12 is formed at its forward end portion with an enlarged head 16 exposed to the pressure fluid. Head 16 has sealing engagement against side 14 of wall 11, and can be provided with slots 17 to receive a torque wrench for firmly seating flood valve 10 in the wall opening. A seal, not shown, can be provided between head 16 and wall 11.

Body member 12 is formed with an internal bore 18 extending completely therethrough, bore 18 being of cylindrical configuration and of reduced diameter at the forward end portion to provide an internal shoulder 19 within head 16, and being adapted to provide an open fluid passageway completely through the valve in a manner to be described.

Initially, however, the passageway defined by the wall of bore 18 is closed by a plug in the form of a piston assembly 20 having sliding clearance within bore 18. Piston assembly 20 includes a one-piece member of solid circular section formed at its forward end with a head 21 connected to a heavier rearward end section 22 of greater axial length by a reduced diameter neck 23 defining a circumferential groove receiving an O-ring 24 having sealing engagement against both the piston member and the wall of bore 18, for effectively sealing the bore passage. Head 21 and end 22 have sliding clearance with the wall of bore 18.

The rearward end portion 25 of valve 10 extends into the relatively unpressurized space and is of reduced diameter compared to the externally threaded intermediate body portion engaged in wall 11, to facilitate the insertion of the flood valve into the wall opening. Body member 12 is of annular configuration, and diametrically opposed holes or openings 26 are formed through rearward end portion 25, spaced from but closely adjacent the extreme inner or rearward end 27 of body member 12. A heating element in the form of Nichrome or other electrical heating wire 28 is threaded through openings 26, extending across the end of piston assembly 20, and it is a particular feature of this invention that the heating element also is a retainer, holding piston assembly 20 against movement out of bore 18.

Externally of body member 12, wire 28 is held closely together by a two-hole insulator 29, thereby defining a wire loop confined in openings 26 and blocking the piston assembly 20. Heating wire 28 is enveloped in a high temperature sleeve 30 of insulating material and leads to an electrical connector 31 of conventional design, adapted for connection to a source of electricity at a remote point.

Fluid under pressure on the side 14 of wall 11 will act against piston assembly 20 urging it through bore 18 in the direction of end 27. In addition, coil spring 32 can be positioned within bore 18, bearing at one end against shoulder 19 and at its opposite end against the head portion 21 of piston assembly 20, thereby also urging piston assembly 20 in the direction of the rearward portion of the valve. The use of spring 32 insures a snug, tight assembly and is preferred Piston assembly 20 also includes a heat shield 36, which can be in the form of a thin, circular disk of ceramic material, positioned between section 22 and heating wire section 33, the heat shield protecting section 22 of the piston from the melting action of the heating element.

Normally, piston assembly 20 is restrained by the heating element 28, and particularly the section 33 thereof which extends through openings 26 and across the end face of heat shield 36. In this condition shown in FIG. 1, piston assembly 20 is retained within valve 10 by the heating element and effectively seals bore 18, maintaining the fluid on side 14 of wall 11 out of communication with the relatively unpressurized space on side 15 of that wall.

When it is desired to admit fluid into the relatively unpressurized space, the electrical connection to heating element 28 is activated by any suitable means, which can be entirely conventional, for energizing the wire 28 in response to any preselected action or signal. Upon energization, wire 28 heats up almost instantly, and because of its high resistance, quickly reaches an elevated temperature above the melting temperature of the material of which body member 12 is made. This can be any suitable plastic material, with polyvinyl chloride being an excellent example, which will melt at a relatively low temperature while maintaining its integrity under temperature conditions encountered during normal use. However, upon passing current through wire 28, causing it to heat up, wire 28 rapidly burns its way through the material of body member section 34 between openings 26 and the extreme end 27 of the body member. Spring 32, and the pressure fluid, will continue to force piston assembly 20 and its heat shield 36 against the restraining section 33 of heating element 28 as it burns its way through body section 34, constantly urging it against the plastic material still holding the heating element section 33 within the body member, until it has burned completely through, leaving grooves 35 from openings 26 through section 34 to the inner end 27 of the valve body. Once the restraining section 33 of heating element 28 has burned through the body member, both it and piston assembly 20 are released, with the piston assembly and its heat shield being expelled from bore 18 by the combined action of spring 32 and the pressure fluid, whereupon fluid passes into the relatively unpressurized space through the open ended bore 18 of the flood valve.

Piston member 21, 22, 23 also can be of any suitable plastic material, preferably having a higher melting point than the PVC body material, for example Teflon. This, in conjunction with heat shield 36, insures the continued integrity of the piston assembly as the heating element melts its way through the body material to open the valve.

From the foregoing, it is seen that the flood valve of this invention accomplishes its intended objects. It is a very simple and relatively inexpensive construction, readily molded, formed and assembled. Body member 12 and piston member 21, 22, 23 each can be molded as a one-piece member of suitable plastic material, openings 26 are drilled through the wall of member 12 and heating element 28 is quickly threaded therethrough. At the same time, valve 10 is highly dependable, extremely fast-acting, silent in operation, and can be activated from a remote point.

While a specific embodiment has been shown and described in detail, it will be appreciated that this has been done by way of example only and that the invention is intended to be defined by the appended claims.

We claim:

1. A flood valve adapted to be mounted in an opening provided through a wall separating a fluid on one side thereof from a space on the other side thereof, said flood valve comprising:

(a) a body member adapted to normally close such opening to sealingly separate the fluid from the space, said body member having a forward portion adapted to be sealingly mounted in such opening and having a rearward portion communicating with the space, said body member also having a bore open to the fluid and extending through said rearward portion;

(b) a piston assembly slidably mounted in said bore, said piston assembly having one face exposed to the fluid and arranged in sealing engagement with the wall of said bore to sealingly separate the fluid from the space; and (c) an electrical heating element extending through said rearward portion and restraining said piston assembly against movement through said rearward portion;

(d) said heating element being adapted to be selectively energized to melt the material of said rearward portion and thereby permit movement of said piston assembly through said rearward portion to admit the fluid into the space.

2. A flood valve as set forth in claim 1, together with means urging said piston assembly through said bore in the direction of said rearward portion.

3. A flood valve as set forth in claim 2, wherein said means urging said piston assembly through said bore comprises a spring urging said piston assembly against said restraining heating element.

4. A flood valve as set forth in either claim 2 or claim 3, wherein said heating element comprises a heating wire extending across said bore and through openings in the wall of said rearward portion on opposite sides of said bore.

5. A flood valve as set forth in claim 1, wherein said piston assembly includes a heat shield engageable against said heating element.

6. A flood valve as set forth in claim 1, wherein said body member is a one-piece construction of synthetic plastic material having a melting point below the temperature of said heating element when the latter is energized.

7. A flood valve as set forth in claim 6, wherein said plastic material is poly vinyl chloride.

8. A flood valve as set forth in claim 1, wherein said piston assembly includes a one piece plug having sliding clearance with the wall of said bore and having a circumferential groove, and an O-ring in said groove in sealing engagement with said bore wall.

9. A flood valve as set forth in claim 8, wherein said plug is of synthetic plastic material, together with a heat shield between said plug and said heating element.

10. A flood valve as set forth in claim 9, wherein said plastic material is Teflon.

11. A flood valve as set forth in claim 1, in combination with a body having a barrier wall with an opening therethrough, said valve being mounted in said opening.

12. A flood valve as set forth in claim 11, wherein said body contains a relatively unpressurized space defined at least in part by one side of said wall, the opposite side of said wall being exposed to relatively pressurized fluid.

13. A flood valve as set forth in claim 11, wherein said body contains a space defined at least in part by one side of said wall, and a relatively pressurized fluid within said space, the other side of said wall being exposed to a relatively unpressurized fluid.

* * * * *